United States Patent
Frenzel et al.

(10) Patent No.: US 10,387,735 B2
(45) Date of Patent: *Aug. 20, 2019

(54) MONITORING UNIT FOR A MOTOR VEHICLE, HAVING PARTIAL COLOR ENCODING

(71) Applicant: Continental Automotive GmbH, Hannover (DE)

(72) Inventors: Henryk Frenzel, Regensburg (DE); Thorsten Koehler, Deverling (DE); Stephan Voltz, Happurg (DE); Ulrich Wagner, Langenargen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,184

(22) Filed: Aug. 20, 2018

(65) Prior Publication Data

US 2018/0357497 A1    Dec. 13, 2018

Related U.S. Application Data

(63) Continuation of application No. 14/636,773, filed on Mar. 3, 2015, now Pat. No. 10,055,654, which is a
(Continued)

(30) Foreign Application Priority Data

| May 25, 2004 | (DE) | ................. | 10 2004 025 541 |
| Jun. 1, 2004 | (DE) | ................. | 10 2004 026 591 |

(51) Int. Cl.
*G06K 9/00*  (2006.01)
*G06K 9/20*  (2006.01)
(Continued)

(52) U.S. Cl.
CPC .......... *G06K 9/00818* (2013.01); *G02B 5/20* (2013.01); *G06K 9/00798* (2013.01);
(Continued)

(58) Field of Classification Search
CPC .... G02B 5/20; G06K 9/00818; G06K 9/2018; H04N 5/369
(Continued)

(56) References Cited

U.S. PATENT DOCUMENTS

| 3,971,065 A | 7/1976 | Bayer |
| 4,330,797 A | 5/1982 | Yokokawa et al. |

(Continued)

FOREIGN PATENT DOCUMENTS

| EP | 0 830 267 | 7/2002 |
| EP | 1 418 089 | 5/2004 |

(Continued)

OTHER PUBLICATIONS

Office Action in U.S. Appl. No. 10/593,840, dated Apr. 11, 2011, 12 pages.
(Continued)

*Primary Examiner* — On S Mung
(74) *Attorney, Agent, or Firm* — W. F. Fasse (57) ABSTRACT

A monitoring unit for monitoring an environment outside of a motor vehicle includes a camera with an imaging sensor that has both color pixels and monochrome pixels. Pixel groups each include one or two color pixels and respectively three or two monochrome pixels. The pixel groups are arranged in a repeating pattern of partial color encoding.

28 Claims, 5 Drawing Sheets

Related U.S. Application Data continuation of application No. 10/593,840, filed as application No. PCT/EP2005/052080 on May 6, 2005, now Pat. No. 9,524,439.

(51) Int. Cl.

| | | |
|---|---|---|
| *G06T 1/00* | (2006.01) | |
| *H04N 9/04* | (2006.01) | |
| *H04N 9/64* | (2006.01) | |
| *G02B 5/20* | (2006.01) | |
| *H04N 5/369* | (2011.01) | |

(52) U.S. Cl.
CPC .......... *G06K 9/2018* (2013.01); *G06T 1/0007* (2013.01); *H04N 5/369* (2013.01); *H04N 9/04* (2013.01); *H04N 9/64* (2013.01)

(58) Field of Classification Search
USPC ........................................................ 348/113
See application file for complete search history.

(56) References Cited

U.S. PATENT DOCUMENTS

| | | | |
|---|---|---|---|
| 5,221,963 | A | 6/1993 | Hashimoto et al. |
| 5,398,077 | A | 3/1995 | Cok et al. |
| 5,987,174 | A | 11/1999 | Nakamura et al. |
| 6,173,108 | B1 | 1/2001 | Ohashi |
| 6,320,176 | B1 | 11/2001 | Schofield et al. |
| 6,320,618 | B1 | 11/2001 | Aoyama |
| 6,455,831 | B1 | 9/2002 | Bandera et al. |
| 6,573,490 | B2 | 6/2003 | Hochstein |
| 6,977,683 | B1 | 12/2005 | Okada |
| 7,259,367 | B2 | 8/2007 | Reime |
| 8,588,920 | B2 | 11/2013 | Naughton |
| 9,270,899 | B1 | 2/2016 | Ivanchenko |
| 9,335,264 | B2 | 5/2016 | Kroekel et al. |
| 2001/0052938 | A1 | 12/2001 | Itoh |
| 2002/0039142 | A1 | 4/2002 | Zhang |
| 2002/0044209 | A1 | 4/2002 | Saito |
| 2002/0081029 | A1 | 6/2002 | Marugame |
| 2003/0001121 | A1 | 1/2003 | Hochstein |
| 2003/0048493 | A1 | 3/2003 | Pontifex et al. |
| 2004/0008410 | A1 | 1/2004 | Stam et al. |
| 2004/0090550 | A1 | 5/2004 | Park |
| 2004/0091133 | A1 | 5/2004 | Monji |
| 2004/0141057 | A1 | 7/2004 | Pallaro et al. |
| 2005/0146629 | A1 | 7/2005 | Muresan |
| 2006/0050082 | A1 | 3/2006 | Jeffrey |
| 2006/0072319 | A1 | 4/2006 | Dziekan et al. |
| 2006/0145220 | A1 | 7/2006 | Hwang |
| 2006/0215049 | A1 | 9/2006 | Sandini et al. |
| 2007/0159544 | A1 | 7/2007 | Hu |
| 2008/0043099 | A1 | 2/2008 | Stein et al. |
| 2010/0134616 | A1 | 6/2010 | Seger et al. |
| 2012/0038801 | A1 | 2/2012 | Yamada |
| 2012/0200733 | A1 | 8/2012 | Utsugi |
| 2012/0293695 | A1 | 11/2012 | Tanaka |
| 2013/0070109 | A1 | 3/2013 | Gove et al. |
| 2013/0258112 | A1 | 10/2013 | Baksht |
| 2014/0063306 | A1 | 3/2014 | Scott |
| 2014/0354773 | A1 | 12/2014 | Venkataraman et al. |
| 2015/0213319 | A1 | 7/2015 | Frenzel et al. |
| 2016/0080659 | A1 | 3/2016 | Kroekel et al. |

FOREIGN PATENT DOCUMENTS

| | | |
|---|---|---|
| EP | 1 764 835 | 3/2007 |
| JP | 09-035065 A | 2/1997 |
| JP | 11-351862 A | 12/1999 |
| JP | 2002-026304 A | 1/2002 |
| JP | 2004-040409 A | 2/2004 |
| JP | 2004-104646 A | 4/2004 |
| JP | 2004-304706 A | 10/2004 |
| WO | WO 96/038319 | 12/1996 |
| WO | WO 01/070538 | 9/2001 |
| WO | WO 09/027134 | 3/2009 |

OTHER PUBLICATIONS

Office Action in U.S. Appl. No. 10/593,840, dated Sep. 14, 2011, 14 pages.
Final Office Action in U.S. Appl. No. 10/593,840, dated Feb. 17, 2012, 17 pages.
Advisory Action in U.S. Appl. No. 10/593,840, dated May 1, 2012, 6 pages.
USPTO Patent Trial and Appeal Board, Decision on Appeal in U.S. Appl. No. 10/593,840, mailed May 18, 2015, 7 pages.
U.S. Office Action in U.S. Appl. No. 10/593,840, dated Nov. 23, 2015, 33 pages.
U.S. Office Action in U.S. Appl. No. 14/636,617, dated Feb. 9, 2016, 24 pages.
U.S. Final Office Action in U.S. Appl. No. 10/593,840, dated May 31, 2016, 23 pages.
U.S. Final Office Action in U.S. Appl. No. 14/636,617, dated Aug. 10, 2016, 29 pages.
U.S. Advisory Action in U.S. Appl. No. 14/636,617, dated Nov. 30, 2016, 3 pages.
Gislin Dagnelie, "Visual Prosthetics", Physiology, Bioengineering, Rehabilitation, Springer, Chapter 1, 2011, pp. 3 to 21.
Robert F. Schmidt et al., "Neuro- and Sinnesphysiologie" ("Neuro- and Sensory Physiology"), Springer Instructional Book, 5th Edition, Chapter 10, 2006, Heidelberg, Germany, pp. 243 to 273, with partial English translation of pp. 265 to 267.

MONITORING UNIT FOR A MOTOR VEHICLE, HAVING PARTIAL COLOR ENCODING

CROSS-REFERENCE TO RELATED APPLICATIONS

This application is a Continuation under 35 USC 120 of copending U.S. patent application Ser. No. 14/636,773 filed on Mar. 3, 2015, which was a Continuation under 35 USC 120 of U.S. patent application Ser. No. 10/593,840 filed on Sep. 22, 2006 as the U.S. National Stage under 35 USC 371 of PCT International Application PCT/EP2005/052080 filed on May 6, 2005 and issued as U.S. Pat. No. 9,524,439 on Dec. 20, 2016. The entire disclosures of the prior applications are incorporated herein by reference. This application is also related to U.S. patent application Ser. No. 14/636,617 filed on Mar. 3, 2015 and issued as U.S. Pat. No. 9,704,048 on Jul. 11, 2017.

PRIORITY CLAIM

Through the abovementioned prior applications, this application claims the priority under 35 USC 119 of German Patent Application 10 2004 025 541.5 filed on May 25, 2004, and German Patent Application 10 2004 026 591.7 filed on Jun. 1, 2004. The entire disclosures of the foreign priority applications are incorporated herein by reference.

FIELD OF THE INVENTION

The present invention relates to a monitoring unit or system for monitoring, recording or imaging the outside or exterior environment of a motor vehicle, for example in a motor vehicle's direction of travel, including at least one camera system having an image-recording sensor.

BACKGROUND INFORMATION

Intelligent Advanced Driver Assistance Systems (ADAS) will play an increasingly important role in modern motor vehicles of the future. Future vehicles will contain, for example, monitoring units such as camera systems having, for instance, digital CMOS (Complementary Metal-Oxide Semiconductor) or CCD (Charge-Coupled Device) image sensors as aids that monitor, record or image the outside environment, for example in the motor vehicle's direction of travel.

In connection with such image processing systems used in the automotive sector for detecting the driving environment, a pure black/white (B/W), that is to say monochrome, image recording is more advantageous than color image recording for most tasks. However, applications do exist where color information obtained from, for example, the three RGB primary colors red (R), green (G), and blue (B), and/or other colors such as, for instance, yellow (Y) etc., can be important for attaining a higher confidence level of the output vector generated by an image processing system.

An instance thereof is traffic sign recognition, wherein it is possible to recognize, by way of the, where applicable, individual color information (R and/or G and/or B and/or other colors such as, for instance, Y etc.), whether the sign concerned is a prohibition sign or a sign giving orders, or one that purely provides information.

Another function is the recognition of colored lane markings, for example, in roadwork or construction areas. Color information is helpful here too, and is necessary to be able, for example, to distinguish between the normal white markings that are no longer valid and the additional yellow lane markings that pertain within the roadwork or construction area.

Conversely, purely monochrome (B/W) image recording is sufficient for a recognition of objects such as obstacles, other vehicles, bicyclists or other persons, because color information (R, G, B, Y etc.) will as a rule not provide better recognition quality in this context.

SUMMARY OF THE INVENTION

In view of the above, it is an object of one or more embodiments of the invention to provide an improved monitoring unit or imaging system for monitoring, recording or imaging the exterior environment outside of a motor vehicle, especially in the motor vehicle's direction of travel, which monitoring unit includes at least one camera system having an image-recording sensor. It is another object of one or more embodiments of the invention to provide an improved driver assistance system for a motor vehicle, in particular for traffic-sign and/or traffic-lane detection. The invention further aims to avoid or overcome the disadvantages of the prior art, and to achieve additional advantages, as apparent from the present specification. The attainment of these objects is, however, not a required limitation of the claimed invention.

Embodiments of the invention further develop generic monitoring units or imaging systems for imaging the outside environment of a motor vehicle in the direction of travel, in that the monitoring unit includes at least one camera system having an image-recording sensor having color coding (R, G, B, Y, . . .) in partial areas but otherwise monochrome coding (B/W). Embodiments of the present invention thus proceed from an image-recording sensor that is substantially embodied or coded as monochrome (B/W), and additionally has color coding (R and/or G and/or B and/or other colors such as, for instance, Y etc.) in partial areas thereof.

For the purpose of recognizing or assigning specific colors of traffic signs, it is proposed to provide a color coding (R and/or G and/or B and/or other colors such as, for instance, Y etc.) of vertical stripes and/or areas on the right-hand and/or left-hand image edge. Because traffic signs move from the center of the image outward from the perspective of a camera mounted in the front area of a motor vehicle traveling in a straight line, the color of the sign and the basic information associated therewith (prohibition, orders, other information) can be advantageously determined when the sign is located within the color-coded stripes or, as the case may be, areas.

For the purpose of recognizing the e.g. yellow or white color of a lane marking, it is proposed to provide a color coding (R and/or G and/or B and/or other colors such as, for instance, Y etc.) of horizontal stripes and/or areas on the sensor's bottom image edge, preferably in the area where the camera has a view onto the road directly over the hood, particularly in the case of a customary passenger automobile. The camera can, of course, be arranged analogously when the inventive monitoring unit is employed in a truck or van etc. This area is not absolutely essential for image evaluation with regard to object detection or lane detection, and can thus advantageously be used for color-recognition purposes. Because traffic lanes can be seen from the center/top of the central image area down to the bottom left-hand or right-hand image area when the camera is mounted on the front of a vehicle traveling in a straight line, then in addition to the traffic lane's position the color can advantageously be determined and made available to an image-processing system e.g. image processor.

In order to obtain the desired color information (R and/or G and/or B and/or other colors such as, for instance, Y etc.), it s is proposed to attach a tiny color filter, where applicable specifically accommodated to the application, in front of each individual cell (pixel) of the pertinent stripes or areas.

In a first embodiment, the color-coded stripes and/or areas are embodied as, for example, a single color (R; Y; etc. . . . ). The vertical stripes and/or areas expediently have, for example, a red (R) color coding, and the horizontal stripes and/or areas preferably have a yellow (Y) color coding.

Alternatively or additionally, the color-coded horizontal and vertical stripes and/or areas can be embodied as a combination of two colors (R, G). In particular, vertical stripes and/or areas having red (R) and green (G) color coding have proved useful for increasing the contrast of signs that give orders and are placed in front of trees.

In a further embodiment, for obtaining the desired color information (R, G, B), it is proposed to arrange a tiny color filter in one of the three RGB primary colors red (R), green (G), and blue (B) in front of each individual cell (pixel) of the pertinent stripes or areas, whereby the filters are preferably arranged in the so-called "Bayer pattern".

Another embodiment of the invention further comprises an assistance system having a monitoring unit of the aforementioned type. The monitoring unit's advantages will in this way also come to bear within the scope of an overall system, in particular for traffic-sign and/or traffic-lane detection. The ratio of monochrome coding (B/W) to partial color coding is therein preferably 80:20%. Depending on the focus of the specific application, the partial color-coded areas can also occupy 25% or up to 40% of the sensor surface.

The main advantage of a monitoring unit according to an embodiment of the invention for imaging the outside environment in a motor vehicle's direction of travel or, as the case may be, of an assistance system for motor vehicles including such a monitoring unit, having a partially color-coded (R and/or G and/or B and/or other colors such as, for instance, Y etc.) camera is that all relevant data for imaging or detecting driving environments can for the first time be obtained using just one camera. Owing to the camera's substantially monochrome (B/W) image recorder, there will be no constraints on sensitivity so that reliable evaluation will be ensured even in poor light conditions. The color coding (R and/or G and/or B and/or other colors such as, for instance, Y etc.) in the sensor's edge area will not compromise those applications for which the purely monochrome (B/W) image is more advantageous.

By contrast, the color coding (R and/or G and/or B and/or other colors such as, for instance, Y etc.) having vertical stripes and/or areas on the right-hand and/or left-hand edge of the sensor's image field will provide reliable information about the color (R, G, B, Y, . . . ) of traffic signs. The color coding (R, G, B, Y, . . . ) in the bottom image area will provide reliable information about the color of lane markings.

A single camera can thus be used for all relevant applications, and that will advantageously save costs and mounting or installation space.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
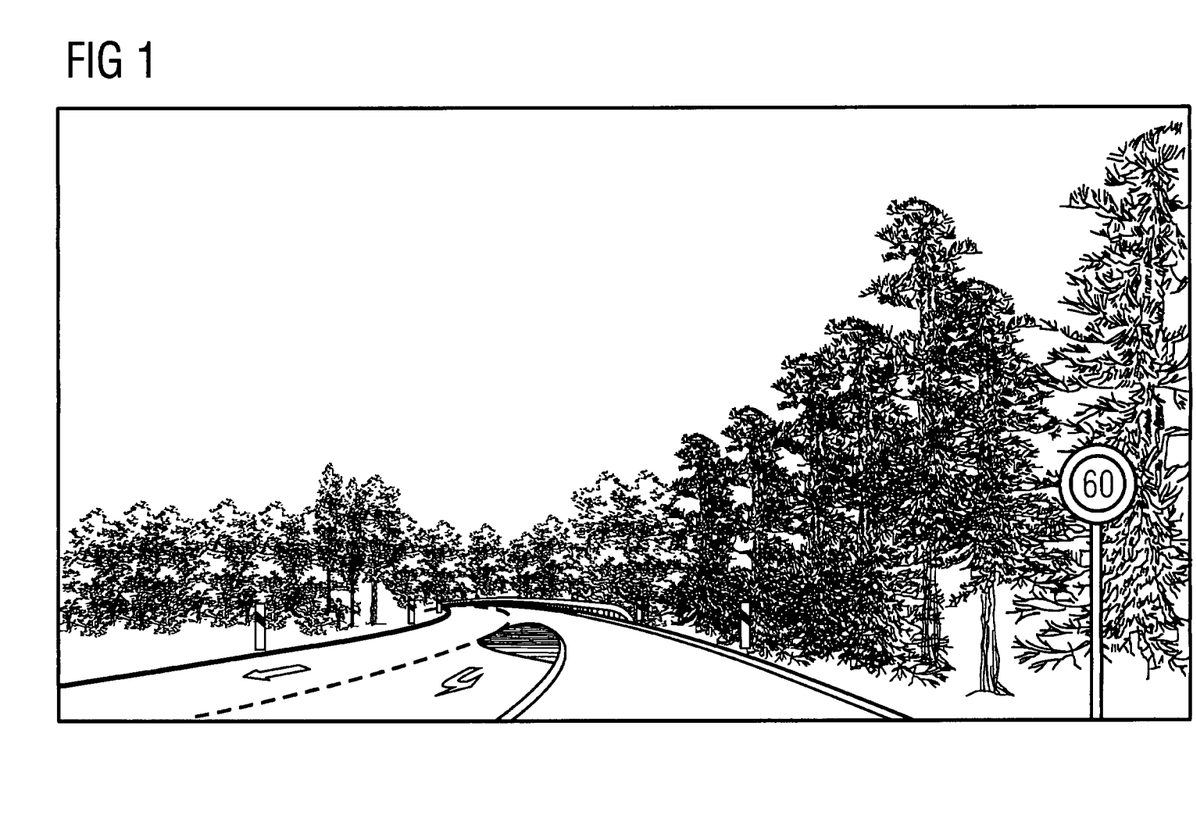
FIG. 1 is an exemplary image of an exterior scene outside a motor vehicle as imaged in monochrome (B/W)

FIG. 1 shows an exemplary image, shown in monochrome, of an exterior scene outside a motor vehicle. What is disadvantageous about such a black/white (B/W) image recording is the lack of color information that could be obtained from, for example, the three primary colors red (R) and/or green (G) and/or blue (B) and/or other colors such as, for instance, yellow (Y) etc.

Such color information (R, G, B, Y, . . .) can be important for attaining a higher confidence level of the output vector generated by an image processing system, in particular for the recognition of traffic signs, wherein by way of the color information (R and/or G and/or B and/or other colors such as, for instance, Y etc.) it can be recognized whether the sign is a prohibition sign or an affirmative requirement sign giving orders, as in the case of the speed-limit sign on the right of the image section shown FIG. 1, or an informational sign that purely provides information (not shown).

A further function is the recognition of colored lane markings associated with roadworks or construction areas. In this regard, it is helpful and necessary to distinguish between the normal white markings, which are no longer valid, and the additional yellow lane markings that apply in the roadwork or construction area.

Conceivable solutions featuring an exclusively color-coded (R, G, B, Y, . . . ) image recorder or sensor are not only more computationally intensive and thus more costly, but also have the disadvantage that monochrome (B/W) images are more favorable or advantageous for a number of exterior scene evaluation applications, in particular for object detection of obstacles, other vehicles, and bicyclists, persons and the like, or night-time applications.

To resolve this conflict of opposed requirements, one or more embodiments of the present invention propose the use, in a monitoring unit, of for example a specially embodied CCD sensor 10 having color coding (R, G, B, Y, . . .) in partial areas 11, 12, 13, but otherwise having monochrome coding (B/W). It should be understood that "monochrome" actually means that the sensor cells are sensitive to all colors of light and only brightness levels of the light are registered, so that such monochrome cells without color coding cannot distinguish between different colors of light, and color filters are arranged over cells that are to be color coded. Thus, an embodiment of the present invention proceeds from a sensor 10 that is embodied or coded substantially as monochrome (B/W), and that additionally has color coding (R and/or G and/or B and/or other colors such as e.g. Y, etc.) in partial areas. That could be achieved by, for instance, a color coding (R, G, B, Y, . . . ) of vertical stripes (not shown) or areas on the right-hand image edge 11 and left-hand image edge 12, and would be helpful, for example, for assigning the correct color (R, G, B, Y, . . . ) to traffic signs. Because the traffic signs move from the center of the image outward, from the perspective of a camera mounted in the front area of a motor vehicle traveling in a straight line, the color (R, G, B, Y, . . . ) of the sign can be determined at the time when the sign is located within the color-coded (R, G, B, Y, . . . ) stripes or areas 11, 12.

An expedient approach for recognizing the color of the traffic lane (yellow or white, for example) is also to provide color coding, in particular yellow (Y) coding, in the bottom area 13 of the sensor 10, preferably in the area where the camera has a view onto the road directly over the hood in the case of a customary passenger automobile. This area is not absolutely essential for an image evaluation with regard to object detection or lane detection, and can thus be used for color-recognition (Y). Because traffic lanes can be seen from the center/top of the central image area down to the bottom left-hand and right-hand image area when the camera is mounted on the front of a vehicle traveling in a straight line, then in addition to the position of the traffic lane, also the color can be determined and made available to the image-processing system. This feature is of course not restricted to motor vehicles having a hood, but rather can be realized analogously when the inventive monitoring unit is employed in particular in a truck or van etc.

Especially also in the case of night-vision applications, the highest possible sensitivity is necessary across the entire, which is to say unfiltered, wavelength range, including the near infrared. Because, however, for this a much smaller detection angle generally has to be detected, it suffices to provide a smaller central area without color coding.

Figure 2:
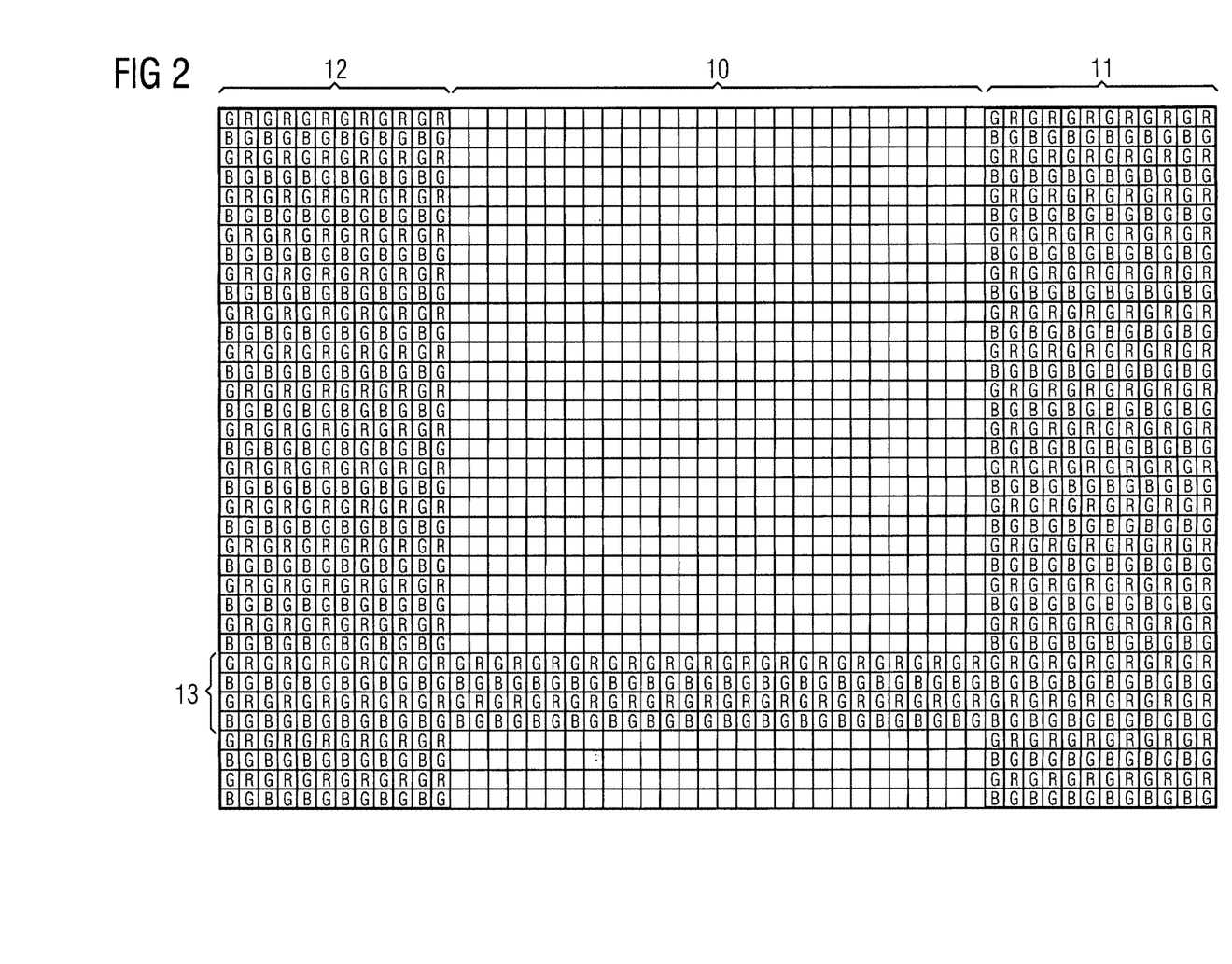
FIG. 2 is a schematic sketch of a possible color-filter distribution (R, G, B) of the image recorder or sensor of a monitoring unit's camera.

FIG. 2 is a schematic sketch of a possible color-filter distribution (R, G, B) of the image sensor 10 of a monitoring is unit's camera. The light-sensitive cells of a non-color-coded (N) CCD sensor 10 in the monitoring unit's digital camera normally only detect or register brightness values. In order to obtain color information (R, G, B, Y, . . . ) with individual sensor cells, tiny color filters are attached respectively in front of those individual sensor cells, for example respectively in one of the three RGB primary colors red (R), green (G), and/or blue (B), and/or another color such as, for instance, yellow (Y) etc. Filters constructed from primary colors are usually attached in the arrangement R-G-R-G and, in the next row, G-B-G-B, which in this arrangement produce the so-called "Bayer pattern".

Figure 3:
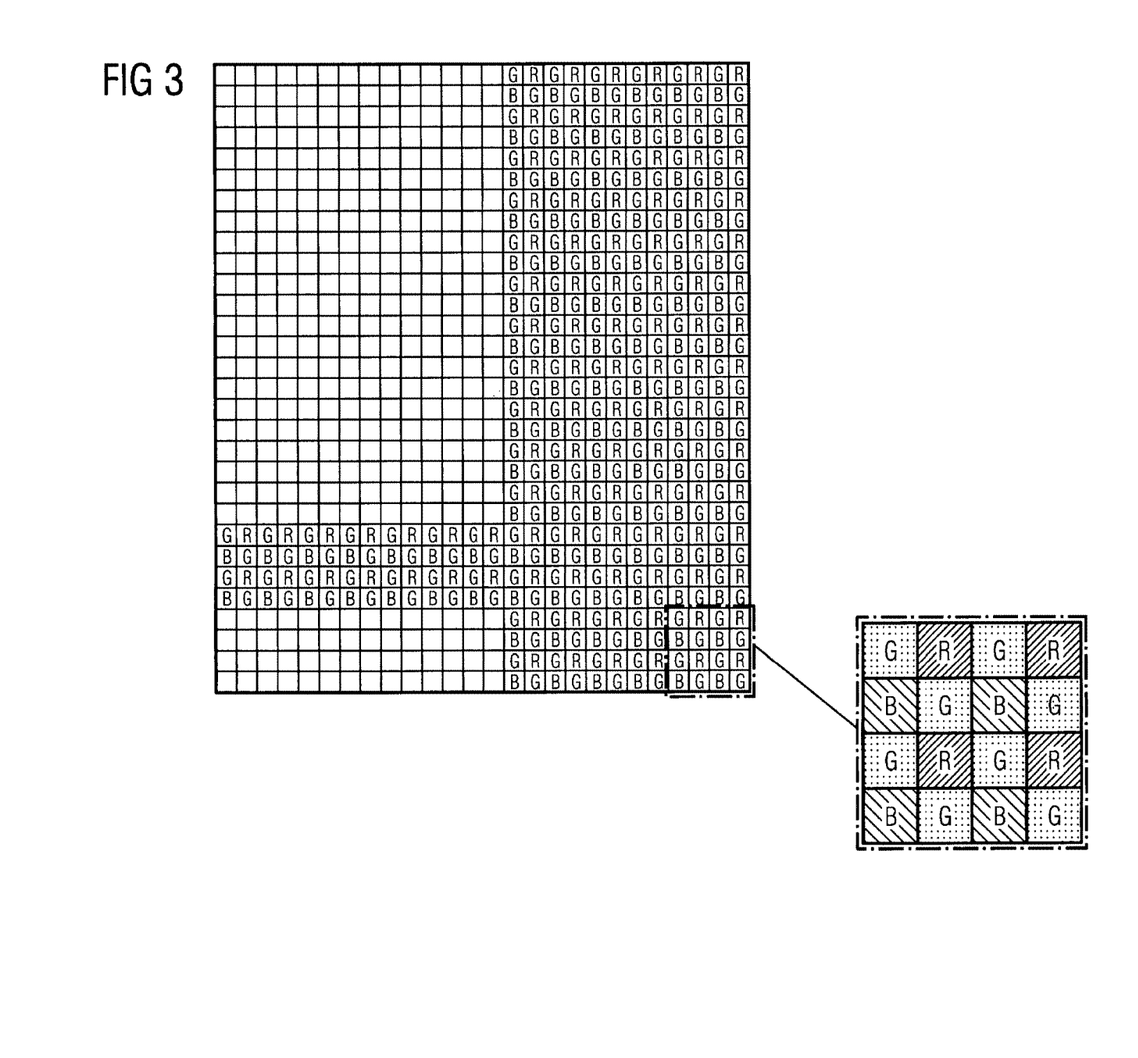
FIG. 3 shows an enlarged portion of the color-filter distribution according to FIG. 2.

FIG. 3 shows an enlarged cut-out portion of a color-filter distribution (R, G, B) according to FIG. 2 arranged as a Bayer pattern. It can clearly be seen how each CCD element only supplies the information for a single color component, so that the adjacent pixels accordingly have to be used for calculating the actual color. This process is referred to as "color interpolation".

Color information useful in the context of road traffic can be obtained within the stripes or areas 11, 12, 13 of the sensor 10 that are coded as a Bayer pattern, by means of such color interpolations, and can thus be made available to an image-processing system.

Figure 4:
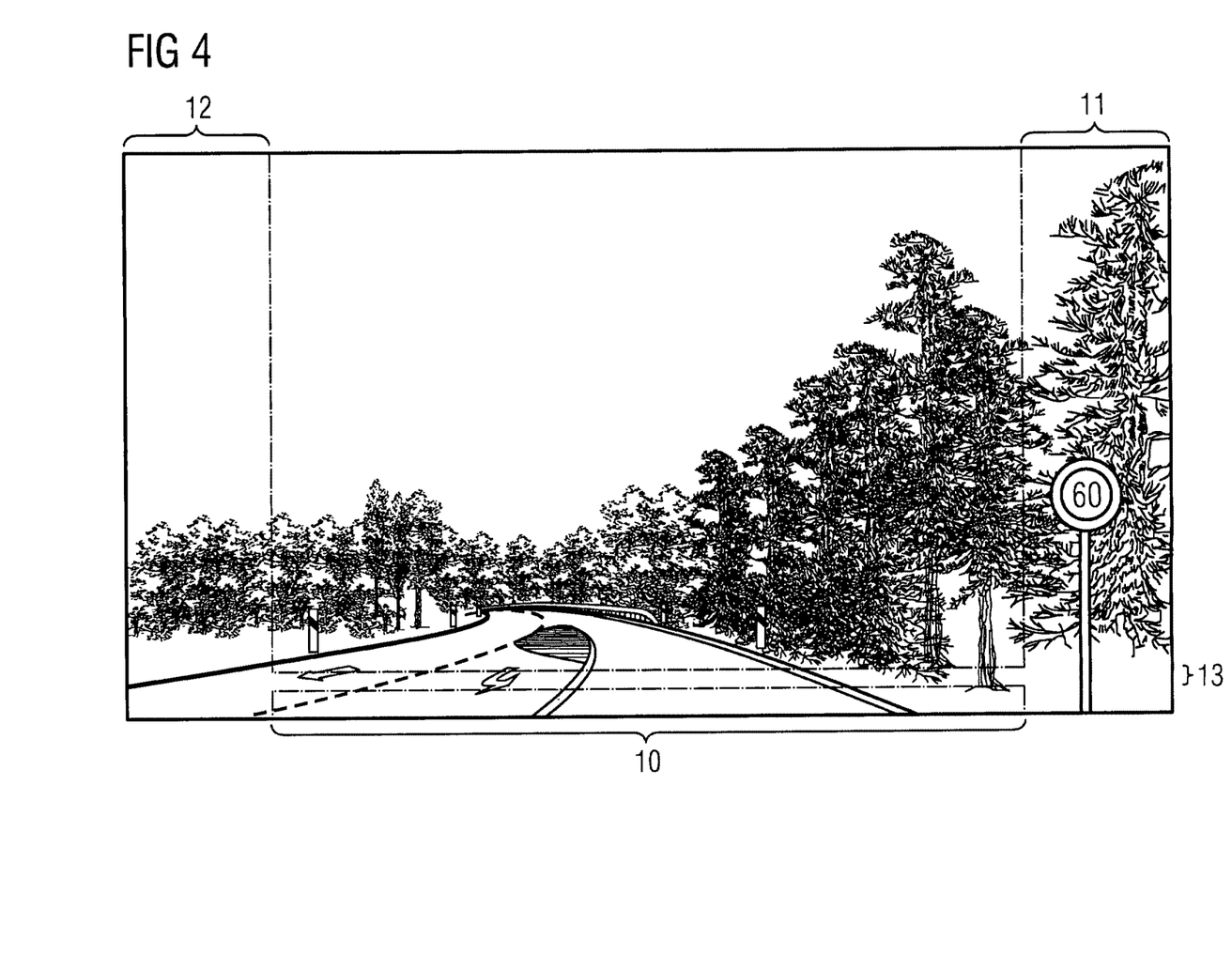
FIG. 4 is the exemplary image according to FIG. 1 showing the exterior scene that has been partially color-coded according to FIG. 2.

The corresponding exemplary image according to FIG. 1 showing an exterior scene that has been partially color-coded according to is FIG. 2 is shown in FIG. 4.

The color information does not necessarily have to consist of the three primary colors. It is also possible to use color filters of only a single color such as, for instance, red (R) for recognizing signs giving orders or yellow (Y) for recognizing lane markings associated with, for example, roadworks or construction areas. Combinations of red (R) and green (G) color filters or other color filters specially adapted to the application have also proved useful for increasing the contrast of signs that give orders and are placed in front of trees. Such color filters can advantageously also be arranged spaced apart from one another, being located, for example, on every other pixel in a row and/or column; namely in any desired combination with non-coded (N) pixels or pixels coded in another color or where applicable specially adapted color filters.

Figure 5A:
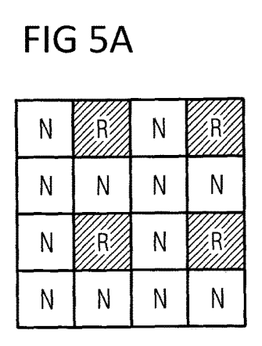
FIGS. 5A, 5B, 5C and 6 are respective further examples of different color-filter distributions of the image recorder or sensor of a monitoring unit's camera.
Figure 5B:
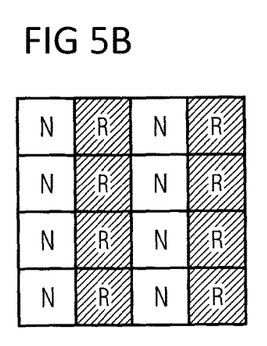
Figure 5C:
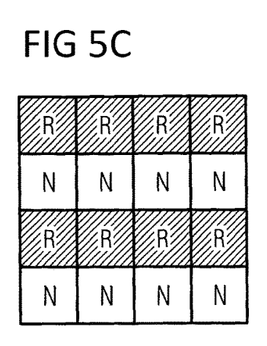
Figure 6:
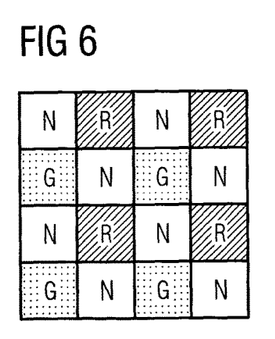

Arrangements that offer this type of advantage and further examples of color coding, which can be used instead of the "Bayer pattern", are shown in FIGS. 5 and 6.

FIGS. 5A, 5B and 5C show further examples of a color-filter distribution of the image sensor of a monitoring unit's camera, and clearly show how only every other pixel in a row or a column, and/or in every other row and every other column of the image sensor, has been provided with a red color filter (R), for example for recognizing signs giving orders. Namely, FIG. 5A shows alternate pixels in every second row and every second is column coded for red (R), with the other pixels non-color-coded (N). Thus in FIG. 5A, in each 2×2 pixel group of four pixels only one pixel is color coded, and the pixel groups are oriented and arranged relative to one another so that the color-coded pixels are all located in alternate rows and alternate columns, interspersed with alternate rows and alternate columns consisting of only non-color-coded pixels. In FIG. 5B, each 2×2 pixel group has two color-coded pixels and two non-color-coded pixels, and the pixels and the pixel groups are oriented and arranged relative to one another so that there are columns of color-coded pixels alternating with columns of non-color-coded pixels. FIG. 5C is similar to FIG. 5B but rotated by 90° so that there are rows of color-coded pixels alternating with rows of non-color-coded pixels.

FIG. 6 shows the advantageous embodiment of a combination of two colors in a color-filter distribution of the image sensor of a monitoring unit's camera. Instead of R-G-R-G and in the next row G-B-G-B as in the case of the "Bayer pattern", in the present example color filters are used in the pattern R-N-R-N and in the next row N-G-N-G, with N signifying no color coding. The pixels are arranged in repeating 2×2 pixel groups, which are arranged and oriented relative to one another so that each row and each column of pixels respectively has color-coded pixels alternating with non-color-coded pixels.

The main advantage of a partially color-coded camera is that all relevant data for imaging or recording driving environments can be obtained using just one camera. Owing to the camera's substantially monochrome (B/W) image sensor there is no constraint or limitation on the sensitivity so that a reliable evaluation will be ensured even in poor light conditions. The color coding (R, G, B, Y, . . . ) in defined edge areas 11, 12, 13 of the sensor 10 will not compromise such applications for which the purely monochrome (B/W) image is more favorable. By contrast, the color coding (R, G, B, Y, . . . ) having vertical stripes on the left-hand image edge 11 and the right-hand image edge 12 of the sensor's image field will provide reliable information about the color (R, G, B, Y, . . . ) of traffic signs, and the color coding (R, G, B, Y, . . . ) in the bottom image area 13 will provide reliable information about the color of traffic lanes.

Thus, a single camera can be used for all applications, and that will advantageously save costs and mounting or installation space.

The present invention is thus especially suitable for implementation in an assistance system for motor vehicles, in particular for traffic-sign and/or traffic-lane detection. It will advantageously increase road-traffic safety not only in combination with existing assistance systems for motor vehicles such as blind-spot detection, lane departure warning (LDW), lane monitoring, night vision, etc.

Although the invention has been described with reference to specific example embodiments, it will be appreciated that it is m intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A monitoring unit for monitoring an exterior scene outside of a motor vehicle, comprising a camera system including an imaging sensor made up of photosensitive pixels including color pixels and monochrome pixels, wherein the imaging sensor has a repeating pattern of 2×2 pixel groups that each respectively include exactly four of said photosensitive pixels including exactly one of said color pixels, and wherein all remaining ones of said photosensitive pixels of said imaging sensor are said monochrome pixels.

2. The monitoring unit according to claim 1, wherein all of said color pixels are coded for the same color.

3. The monitoring unit according to claim 2, wherein said same color is red.

4. The monitoring unit according to claim 2, wherein said same color is green.

5. The monitoring unit according to claim 2, wherein said same color is yellow.

6. The monitoring unit according to claim 2, wherein said same color is blue.

7. The monitoring unit according to claim 1, wherein said repeating pattern forms columns and rows of said photosensitive pixels, and said 2×2 pixel groups are arranged so that alternating ones of said rows and alternating ones of said columns consist of only said monochrome pixels.

8. The monitoring unit according to claim 1, wherein an entire photosensitive surface of said imaging sensor is made up of said repeating pattern of said 2×2 pixel groups of said photosensitive pixels.

9. The monitoring unit according to claim 1, wherein said imaging sensor has a first region consisting of a plurality of said 2×2 pixel groups arranged in plural successive contiguous columns and plural successive contiguous rows of said 2×2 pixel groups forming said repeating pattern, and a second region consisting of a plurality of said monochrome pixels arranged in plural successive contiguous rows and plural successive contiguous columns of said monochrome pixels.

10. The monitoring unit according to claim 1, wherein said color pixels include first color pixels coded for a first color and second color pixels coded for a second color different from said first color, first ones of said 2×2 pixel groups each respectively include one of said first color pixels, second ones of said 2×2 pixel groups each respectively include one of said second color pixels, and said imaging sensor has a first area consisting of a contiguous plurality of said first 2×2 pixel groups and a second area consisting of a contiguous plurality of said second 2×2 pixel groups.

11. The monitoring unit according to claim 10, wherein said first color is red and said second color is yellow.

12. The monitoring unit according to claim 10, wherein said first color is red and said second color is blue.

13. The monitoring unit according to claim 10, wherein said first color is red and said second color is green.

14. The monitoring unit according to claim 10, wherein said first color is blue and said second color is green.

15. The monitoring unit according to claim 10, wherein said imaging sensor has a first region consisting of a plurality of said 2×2 pixel groups arranged in plural successive contiguous columns and plural successive contiguous rows of said 2×2 pixel groups forming said repeating pattern, and a second region consisting of a plurality of said monochrome pixels arranged in plural successive contiguous rows and plural successive contiguous columns of said monochrome pixels, and wherein said first region includes said first area and said second area.

16. The monitoring unit according to claim 1, wherein each one of said color pixels respectively comprises a respective photodetector cell and a respective color filter of a respective primary color arranged in front of said respective photodetector cell, and each one of said monochrome pixels respectively comprises a respective photodetector cell without a color filter.

17. A monitoring unit for monitoring an exterior scene outside of a motor vehicle, comprising a camera system including an imaging sensor made up of photosensitive pixels including color pixels and monochrome pixels, wherein the imaging sensor has a repeating pattern of 2×2 pixel groups that each respectively include exactly four of said photosensitive pixels including exactly two of said color pixels, and wherein all remaining ones of said photosensitive pixels of said imaging sensor are said n monochrome pixels.

18. The monitoring unit according to claim 17, wherein all of said color pixels are coded for the same color.

19. The monitoring unit according to claim 18, wherein said same color is red.

20. The monitoring unit according to claim 17, wherein said color pixels include first color pixels coded for a first color and second color pixels coded for a second color different from said first color, and wherein said two color pixels in each one of said 2×2 pixel groups consist of one of said first color pixels and one of said second color pixels.

21. The monitoring unit according to claim 20, wherein said first color is red and said second color is green.

22. The monitoring unit according to claim 20, wherein said first color is blue and said second color is green.

23. The monitoring unit according to claim 20, wherein said first color is yellow and said second color is green.

24. The monitoring unit according to claim 20, wherein said first color is blue and said second color is yellow.

25. The monitoring unit according to claim 17, wherein said repeating pattern forms columns and rows of said photosensitive pixels, and said 2×2 pixel groups are arranged so that alternating ones of said rows or alternating ones of said columns consist of only said monochrome pixels.

26. The monitoring unit according to claim 17, wherein said imaging sensor has a first region consisting of a plurality of said 2×2 pixel groups arranged in plural successive contiguous columns and plural successive contiguous rows of said 2×2 pixel groups forming said repeating pattern, and a second region consisting of a plurality of said monochrome pixels arranged in plural successive contiguous rows and plural successive contiguous columns of said monochrome pixels.

27. An image sensor comprising light-sensitive pixels including color pixels and monochrome pixels covering an area of the image sensor, wherein:
- the color pixels include first color pixels that are color-coded to be sensitive to a first color, and second color pixels that are color-coded to be sensitive to a second color different from the first color,
- the monochrome pixels are not color-coded,
- the light-sensitive pixels are arranged in a checkerboard pattern in which the color pixels alternate with the monochrome pixels in each row along a row direction and in each column along a column direction, and in which the first color pixels alternate with the second color pixels in two diagonal directions that extend obliquely to the row direction and the column direction, and
- the first color and the second color are red and green respectively, or red and yellow respectively, or yellow and blue respectively, or yellow and green respectively, or green and blue respectively.

28. The image sensor according to claim 27, wherein said area of said image sensor covered by said light-sensitive pixels is a first partial area of a photosensitive sensor surface of said image sensor, said image sensor further includes additional pixels that are light-sensitive and that cover a second partial area of said photosensitive sensor surface, and said additional pixels are not color-coded.

* * * * *